Patented Sept. 30, 1952

2,612,525

UNITED STATES PATENT OFFICE 2,612,525

PRODUCTION OF PENTAERYTHRITOL

Max O. Robeson and Solon A. Blundell, Jr., Corpus Christi, Tex., assignors to Celanese Corporation of America, a corporation of Delaware No Drawing. Application March 26, 1949, Serial No. 83,766

6 Claims. (Cl. 260—635)

This invention relates to a process for the production of pentaerythritol.

An object of this invention is the provision of an improved process for the production of pentaerythritol by reacting formaldehyde and acetaldehyde wherein the formation of excessive amounts of dipentaerythritol and polypentaerythritol may be avoided.

Other objects of this invention will appear from the following detailed description.

The vapor phase partial oxidation of aliphatic hydrocarbons, such as propane, butane or mixtures thereof, employing air or oxygen as the oxidizing agent, yields a complex mixture of products including formaldehyde, acetaldehyde, methanol, acetone, methylal and other acetals, methyl ethyl ketone, tetrahydrofuran and other oxides as well as a number of other organic compounds. The oxidation is effected by mixing butane or propane with a predetermined amount of air or oxygen, heating the mixture to reaction temperature, allowing the resulting exothermic oxidation reaction to proceed to the desired degree and then halting the reaction by quenching the hot reaction gases with cool water. The formaldehyde present in the hot reaction gases is absorbed in the quench water and the latter is then purified to yield aqueous formaldehyde solutions of the desired concentration which may be employed satisfactorily as an intermediate for any of the widely diversified commercial reactions which utilize formaldehyde.

One of said reactions involves the formation of pentaerythritol by the exothermic reaction of a mixture of formaldehyde and acetaldehyde in an aqueous alkaline medium and is well known. Normally, the exothermic reaction is effected in a plurality of stages, the reaction being initiated at a relatively low temperature and then completed by effecting a secondary reaction at a considerably higher temperature. In effecting the reaction described one of the major problems is to avoid the formation of dipentaerythritol and polypentaerythritol in excessive amounts. These higher molecular weight reaction products are considered impurities and their presence is usually quite undesirable. In order to effect the desired secondary condensation reaction a relatively high temperature is usually necessary to initiate it. However, the use of a relatively high reaction temperature is prone to yield appreciable amounts of dipentaerythritol and polypentaerythritol.

We have found, however, that aqueous formaldehyde obtained by the vapor phase partial oxidation of hydrocarbons behaves in a fashion different from commercial formaldehyde produced by the oxidation of methanol, for example, and that pentaerythritol may be formed very rapidly and in excellent yield from said formaldehyde when reacted with acetaldehyde without the production of excessively high amounts of dipentaerythritol and polypentaerythritol. By employing formaldehyde obtained by the vapor phase partial oxidation of aliphatic hydrocarbon the initial reaction may be effected at a higher temperature than heretofore employed and the secondary reaction initiated and completed at an appreciably lower temperature. In accordance with our novel process, a mixture of formaldehyde obtained by the vapor phase partial oxidation of aliphatic hydrocarbons, and acetaldehyde in suitable molecular proportion is added to an aqueous slurry of calcium hydroxide and an initial exothermic reaction takes place, the temperature of the reaction mixture being allowed to rise, with temperature control, to a maximum of 105 to 115° F. This initial reaction is continued without further heating for about 15 to 30 minutes, while allowing the temperature to fall. The reaction mixture is then heated to a temperature of about 2 to 15° F. above the previous temperature reached after the temperature has fallen so as to effect a second exothermic reaction. After maximum reaction temperature is attained during the secondary reaction, the reaction mixture is immediately cooled. The calcium hydroxide present in the reaction mixture is then substantially all neutralized, preferably by the addition of sulfuric acid to the reaction mixture, and the calcium sulfate formed filtered off. The pentaerythritol in solution is separated by effecting a vacuum evaporation of the solution, and then crystallizing the pentaerythritol from the concentrated solution obtained by evaporation.

The mixture of formaldehyde and acetaldehyde employed in said reaction preferably contains from 4.5 to 5.5 molecular proportions of formaldehyde for each molecular proportion of acetaldehyde present and the aqueous slurry of calcium hydroxide to which it is added preferably contains 0.6 to 0.8 molecular proportions of calcium hydroxide. Most advantageously, the calcium hydroxide is slurried in such an amount of water that the total aldehyde content in the reaction mixture after the addition is from 14 to 18% by weight of said reaction mixture.

While we do not wish to be bound by any theoretical considerations, it is believed that the unique behavior of aqueous formaldehyde obtained by the vapor phase partial oxidation of aliphatic hydrocarbons in said pentaerythritol reaction is due to the presence of accelerators which, while they do not limit the utility of said aqueous formaldehyde for commercial operations are responsible for the unusual results we have obtained. Thus, said formaldehyde enables the pentaerythritol reaction to be completed in a far shorter time than previously necessary with formaldehyde from other sources, and this reduction in time limits the amount of dipentaerythritol and polypentaerythritol formed.

In order further to illustrate our invention, but without being limited thereto, the following example is given:

*Example*

820 parts by weight (10 molecular proportions) of a 36.7% by weight aqueous solution of formaldehyde, obtained as a product of the vapor phase partial oxidation of aliphatic hydrocarbons such as propane, butane or mixtures thereof, are mixed with 90 parts by weight (2 molecular proportions) of 98% aqueous acetaldehyde and the mixture added rapidly to an aqueous slurry of 95.4 parts by weight of calcium hydroxide (93% purity) in 1500 parts by weight of water. The aldehyde addition is completed in 45 minutes. The total aldehyde concentration in the reaction mixture after the addition is completed is about 16% by weight and the temperature about 70° F. An exothermic reaction takes place and the temperature is allowed to rise over the course of about 20 minutes to 107° F., suitable cooling being provided when the temperature reaches about 95° F. to prevent any excessive rise in temperature over the desired maximum. The reaction mixture is then allowed to stand for 15 minutes during which time the temperature drops to about 98° F. The reaction mixture is then heated over the course of about 15 minutes to 107° F. and, after about 5 to 15 minutes at this temperature a secondary exothermic reaction takes place with the temperature rising to a maximum of about 115° F. When maximum temperature is reached, during the secondary reaction, the sharp aldehydic odor decreases rapidly. After the formaldehyde odor disappears and before any yellow color develops the reaction mixture is immediately cooled and 113 parts by weight of concentrated sulfuric acid added rapidly in the form of a 50% aqueous solution. Calcium sulfate precipitates on addition of the sulfuric acid and is filtered off and washed with about 500 parts by weight of hot water. The colorless or pale green filtrate obtained is combined with the wash water. The combined solution, which contains about 7% by weight of pentaerythritol, has a pH of about 2.9 and contains 3 to 3.5% by weight of formic acid.

The solution thus obtained is then evaporated under a vacuum of 26 to 28 inches of mercury to about one-quarter of its original volume after which the concentrated solution is chilled at about 50° F. for 4 hours. Pentaerythritol crystals are formed on standing and are separated by centrifuging the solution and then washing the crystals with ice-water. The filtrate or mother liquor contains about 6% by weight of formic acid while the evaporator distillate obtained contains 2.8% formic acid, about 60% of the formic acid, originally present coming over during the initial vacuum evaporation. A second crop of crystals may be readily obtained by reducing the volume of the filtrate obtained after the separation of the initial crystalline precipitate to about half its volume and then cooling to 50° F. for 4 hours. The crystals are separated from the liquid by centrifuging and are then washed with ice-water. The total yield of pentaerythritol obtained is about 70 to 75% of which only about 5 to 10% comprises dipentaerythritol and polypentaerythritol. The crystals may be further purified, if desired, by dissolving in hot water, again filtering to remove any calcium sulfate present and then recrystallizing.

The course of the secondary reaction prior to the addition of the sulfuric acid may be followed very conveniently by employing a polarograph. Thus, the gradual decline in the free formaldehyde content may be traced readily and the optimum time for acidification to avoid overcondensation readily determined.

It is to be understood that the foregoing detailed description is given merely by way of illustration and that many variations may be made therein without departing from the spirit of our invention.

Having described our invention, what we desire to secure by Letters Patent is:

1. Process for the production of pentaerythritol, which comprises adding a mixture of acetaldehyde and an aqueous solution of formaldehyde obtained by the vapor phase partial oxidation of aliphatic hydrocarbons to an aqueous slurry of calcium hydroxide, allowing the temperature of the reacting mixture during the resulting exothermic reaction to rise to a maximum of about 105 to 115° F., continuing the reaction without further heating while allowing the temperature to fall, heating the reaction mixture to increase the temperature thereof, above the previous temperature reached after the temperature has fallen, by at most 15° F. to initiate a second exothermic reaction, immediately cooling the reaction mixture after maximum reaction temperature is attained, and then neutralizing the calcium hydroxide in the reaction mixture by adding sulfuric acid thereto.

2. Process for the production of pentaerythritol, which comprises adding a mixture of acetaldehyde and an aqueous solution of formaldehyde obtained by the vapor phase partial oxidation of aliphatic hydrocarbons to an aqueous slurry of calcium hydroxide, allowing the temperature of the reacting mixture during the resulting exothermic reaction to rise to a maximum of about 105 to 115° F., continuing the reaction without further heating while allowing the temperature to fall, heating the reaction mixture to increase the temperature thereof, above the previous temperature reached after the temperature has fallen, by at most 15° F. to initiate a second exothermic reaction, immediately cooling the reaction mixture after maximum reaction temperature is attained, neutralizing the calcium hydroxide in the reaction mixture by adding sulfuric acid thereto, filtering the calcium sulfate precipitate formed, and separating pentaerythritol from the filtrate.

3. Process for the production of pentaerythritol, which comprises adding a mixture consisting of acetaldehyde and an aqueous solution of formaldehyde obtained by the vapor phase partial oxidation of aliphatic hydrocarbons in a ratio of 4.5 to 5.5 molecular proportions of said formaldehyde for each molecular proportion of acetaldehyde to an aqueous slurry containing from 0.6 to 0.8 molecular proportions of calcium hydroxide and sufficient water so that the total aldehydes content after the addition is from 14 to 18% by weight of the reaction mixture formed, allowing the temperature of the reaction mixture during the resulting exothermic reaction to rise to a maximum of about 105 to 115° F., continuing the reaction without further heating for about 15 to 30 minutes while allowing the temperature to fall, heating the reaction mixture and increasing the temperature about 2 to 15° F. above the previous temperature reached after the temperature has fallen and effecting a second exothermic reaction, immediately cooling the reaction mixture after maximum reaction temperature is attained, and then neutralizing the calcium hydroxide in the reaction mixture by adding sulfuric acid thereto.

4. Process for the production of pentaerythritol, which comprises adding a mixture consisting of acetaldehyde and an aqueous solution of formaldehyde obtained by the vapor phase partial oxidation of aliphatic hydrocarbons in a ratio of 4.5 to 5.5 molecular proportions of said formaldehyde for each molecular proportion of acetaldehyde to an aqueous slurry containing from 0.6 to 0.8 molecular proportions of calcium hydroxide and sufficient water so that the total aldehyde content after the addition is from 14 to 18% by weight of the reaction mixture formed, allowing the temperature of the reaction mixture during the resulting exothermic reaction to rise to a maximum of about 105 to 115° F., continuing the reaction without further heating for about 15 to 30 minutes while allowing the temperature to fall, heating the reaction mixture and increasing the temperature about 2 to 15° F. above the previous temperature reached after the temperature has fallen and effecting a second exothermic reaction, immediately cooling the reaction mixture after maximum reaction temperature is attained, neutralizing the calcium hydroxide in the reaction mixture by adding sulfuric acid thereto, filtering the calcium sulfate precipitate formed, and separating pentaerythritol from the filtrate.

5. Process for the production of pentaerythritol, which comprises adding a mixture consisting of about one molecular proportion of acetaldehyde and about 5 molecular proportions of an aqueous solution of formaldehyde obtained by the vapor phase partial oxidation of aliphatic hydrocarbons to an aqueous slurry containing about 0.6 to 0.8 molecular proportions of calcium hydroxide and sufficient water so that the total aldehyde content after the addition is about 16% by weight of the reaction mixture formed, allowing the temperature of the reaction mixture during the resulting exothermic reaction to rise to a maximum of about 107° F., continuing the reaction without further heating for about 15 minutes while allowing the temperature to fall, heating the reaction mixture to increase the temperature to about 2 to 15° F. above that reached at the end of the temperature fall and effecting a second exothermic reaction, immediately cooling the reaction mixture after maximum reaction temperature is attained and the aldehydes substantially all reacted, neutralizing the calcium hydroxide in the reaction mixture by adding sulfuric acid thereto, filtering the calcium sulfate precipitate formed, and separating pentaerythritol from the filtrate.

6. Process for the production of pentaerythritol, which comprises adding a mixture consisting of about one molecular proportion of acetaldehyde and about 5 molecular proportions of an aqueous solution of formaldehyde obtained by the vapor phase partial oxidation of aliphatic hydrocarbons to an aqueous slurry containing 0.8 molecular proportions of calcium hydroxide and sufficient water so that the total aldehyde content after the addition is about 16% by weight of the reaction mixture formed, allowing the temperature of the reaction mixture during the resulting exothermic reaction to rise to a maximum of about 107° F., continuing the reaction without further heating for about 15 minutes while allowing the temperature to fall, heating the reaction mixture to increase the temperature to about 107° F. and effecting a second exothermic reaction, immediately cooling the reaction mixture after a maximum reaction temperature of about 115° F. is attained and the aldehydes substantially all reacted, neutralizing the calcium hydroxide in the reaction mixture by adding sulfuric acid thereto, filtering the calcium sulfate precipitate formed, and separating pentaerythritol from the filtrate.

MAX O. ROBESON.
SOLON A. BLUNDELL, Jr.

REFERENCES CITED

The following references are of record in the file of this patent:

UNITED STATES PATENTS

| Number | Name | Date |
| --- | --- | --- |
| 2,004,010 | Naujoks | June 4, 1935 |
| 2,333,696 | Bludworth | Nov. 9, 1943 |
| 2,401,749 | Burghardt et al. | June 11, 1946 |